United States Patent [19]

Yamazaki

[11] Patent Number: 6,082,865
[45] Date of Patent: Jul. 4, 2000

[54] PROJECTION TYPE DISPLAY DEVICE WITH IMAGE PICKUP FUNCTION AND COMMUNICATION SYSTEM

[75] Inventor: Shunpei Yamazaki, Tokyo, Japan

[73] Assignee: Semiconductor Energy Laboratory Co., Ltd., Kanagawa-ken, Japan

[21] Appl. No.: 09/120,243

[22] Filed: Jul. 22, 1998

[30] Foreign Application Priority Data

Jul. 24, 1997 [JP] Japan .................................. 9-216016

[51] Int. Cl.[7] .................................................... G03B 21/28

[52] U.S. Cl. .................................... 353/122; 353/DIG. 3; 353/98; 353/82

[58] Field of Search .............................. 353/122, DIG. 3, 353/98, 82; 349/6, 7; 359/629, 634, 638

[56] References Cited

U.S. PATENT DOCUMENTS

| | | | |
|---|---|---|---|
| 4,291,954 | 9/1981 | Wilson | 353/15 |
| 4,349,836 | 9/1982 | Sawano | 353/122 |
| 4,811,110 | 3/1989 | Ohmura et al. | 353/122 |
| 4,962,432 | 10/1990 | Ohtsuka et al. | 353/26 A |
| 5,023,657 | 6/1991 | Kuriyama | 353/26 A |
| 5,325,137 | 6/1994 | Konno et al. | 353/DIG. 3 |
| 5,477,280 | 12/1995 | Ko | 359/449 |
| 5,515,121 | 5/1996 | Fujibayashi | 353/26 A |
| 5,526,011 | 6/1996 | Hix et al. | 353/DIG. 3 |

*Primary Examiner*—William Dowling
*Attorney, Agent, or Firm*—Eric J. Robinson; Nixon Peabody LLP

[57] ABSTRACT

A projection type display device including an image pickup device is provided. A projection mirror of an OHP is made a half mirror 108, so that a picture having transmitted through the half mirror can be taken in by an image sensor 102.

33 Claims, 6 Drawing Sheets

PROJECTION TYPE DISPLAY DEVICE WITH IMAGE PICKUP FUNCTION AND COMMUNICATION SYSTEM

BACKGROUND OF THE INVENTION

1. Field of the Invention

The present invention relates to an overhead projector (OHP).

2. Description of the Related Art

If a lecturer speaks while using visual effects, such as writing letters on the blackboard or giving an explanation using an OHP, the following advantages are obtained:

- making a statement clearly understandable by enumerating key words;
- increasing credibility of a statement by presentation of data or the like; and
- enabling the lecturer to depict a color and structure by means of a photograph, drawing and the like, which can not be expressed by words.

There are various methods of providing these visual effects.

Methods of providing visual effects are classified into a direct method and an indirect method.

The direct method is such a method that a listener directly looks at supplementary data. For example, there is a method in which a lecturer brings an actual object to demonstrate in front of a listener, or a method in which a lecturer has a listener directly look at an actual object or its model to understand the three-dimensional shape. A method in which a poster is put or actual writing is made on the blackboard etc. is also included in this direct method.

On the other hand, the indirect method is such a method that a listener indirectly look at supplementary data, and includes a projection type in which a listener looks at an image projected on a screen, and a direct view type in which a listener directly looks at an image projected on a display.

The direct view type uses a liquid crystal display, a plasma display, a light emitting diode, or the like. Since a large screen display is very expensive and requires a considerably wide storage space when it is not used, a number of medium-sized displays are often set in the case where a direct view type display device is used in a large lecture place. Alternatively, a direct view type display device is often used in a small lecture meeting.

The projection type uses a liquid crystal projector, a slide projector, or an overhead projector.

The liquid crystal projector is a projection type display device using a transmission type liquid crystal panel, and is a device for projecting an image displayed on the liquid crystal panel on a screen. Projected light emitted from a lamp and having transmitted through the liquid crystal panel is enlarged by an optical system and is projected on the screen.

The projected light means light travelling until an image to be projected on a screen reaches the screen. That is, light in the space from a liquid crystal panel through which the light transmits to a screen which the light reaches, is defined as the projected light.

The liquid crystal projector is designed such that a personal computer can be connected thereto, and an image displayed on a display of the personal computer is directly displayed on a liquid crystal panel in the liquid crystal projector, and the image is projected on a screen.

Thus, anything which can be displayed on a personal computer can be projected on the screen. For example, it is possible to move a mouse (in this case, it also functions as a pointer) and to write letters, and further, it becomes possible to project an animation and to explain by using realistic pictures. In addition, since pictures can be easily enlarged or reduced on a personal computer, it is possible to vigorously put stress on what a lecturer wants to be seen, and also in this point, it effectively functions as a means for assisting a lecture.

When the liquid crystal panel of the liquid crystal projector is made high pixels, vivid pictures can be presented, and further, by adopting digital blur correction or an optical system, a uniform bright high picture quality is realized. As a result, even if a projection distance is extended, a clear image can be obtained. Thus, the liquid crystal projector is effective even for a large meeting place of a scale of several hundred persons.

The liquid crystal projector is designed such that it is compact and can be easily carried, and when it is used in combination with a notebook-sized personal computer, it does not require a wide space and can be used even in a small meeting place of a scale of several persons to ten and several persons.

The slide projector uses a method in which an image taken on a film by a camera is made a slide and the slide is projected on a screen by a lamp similarly to the foregoing liquid crystal projector.

Since an image is projected on a screen by the same function as enlargement of a photograph, a clear image with high resolution can be projected. Moreover, since the slide projector uses a powerful lamp, a projection distance is long. Thus, it can be used for a large meeting place of a scale of one thousand persons. Moreover, if the slide projector is set in advance, different images can be sequentially supplied by only a switching operation.

The overhead projector (OHP) is a device in which letters or figures are written by an oily pen or are printed on an OHP film made of transparent resin to prepare data for projection, and the data are projected on a screen by a lamp.

The OHP has a feature that although projection is made on an almost vertical screen, an OHP film is placed horizontally. Thus, it is necessary to change the travelling direction of projected light. A mirror is used as a means for changing the travelling direction of projected light. By causing the projected light to be reflected to change its travelling direction, it is possible to project an image on an almost vertical screen.

In the case of a transmission type OHP, as shown in FIG. 6, projected light emitted from a lamp 601 and having transmitted through an OHP film 105 is enlarged by an optical system 108 set above the OHP film, is reflected by a mirror 602 set above the optical system, and is projected on a screen 106.

The optical system is constituted by one or plural lenses, and serves to enlarge or reduce an image, and to adjust focus.

In the foregoing device, although the enlargement of projected light is made prior to the reflection by the mirror, there is also a device for making enlargement after reflection by a mirror. Further, there is also a device in which optical systems are set before and behind a mirror.

There is a plane lens 603 under a stage 104 on which a transparent film is put. Light is emitted from the lamp 601 set below the plane lens, is refracted by the plane lens, and transmits through the transparent film 105 to become projected light. Since this projected light is refracted by the plane lens, it is designed such that the projected light goes in the optical system 108 smaller area than the transparent film.

Focusing can be made through a distance 604 between the plane lens 603 and the optical system 108, or through a distance 605 between the optical system 108 and the screen 106. Concretely, focusing is made by moving the optical system 108 or moving a head portion 107 of the OHP.

Since the structure of the OHP is simple, it has the following advantages: it is inexpensive; it can be compactly folded so that it is convenient to carry; preparation of data is easy; and there is little trouble during a lecture. Accordingly, the OHP is naturally used in a workplace or a meeting place, and is also often used among students. That is, the OHP is a most popular display device for a lecture at present.

There are mainly methods (1) to (3) described below as methods of recording the content of a lecture.

(1) Documents such as a paper and drawing

A method in which one looks at documents such as a copy of supplemental data for an OHP or the like used in the lecture, a paper describing the content of the lecture summarized in shorthand, and an outline of the content of the lecture summarized by a lecturer himself or herself.

(2) Voice

A method in which the content spoken by a lecturer in the lecture is recorded by a tape recorder or an MD disc, and is later reproduced to be heard.

(3) Picture

A method in which pictures are recorded by a video camera, and both voices and pictures are reproduced later. The video camera includes an optical system, an image pickup portion, and a recording portion, and it is possible to take an image at the same viewpoint as a listener. Thus, in the case of a lecture where a projection type display device such as an OHP is used, the object of the image pickup is mainly a screen and a lecturer.

However, the above-mentioned methods have problems to be solved by the present invention, as described below.

In the case of only the method (2) (voice)

In a lecture, understanding of the content is often promoted by addition of visual effects, such as writing letters on a blackboard or giving an explanation using an OHP. Thus, there is also a case where it is insufficient to use only the method (2).

In the case of only the method (1) (documents such as a paper and drawing)

In the method (1), it is impossible to hear to the voice of a lecturer. Also, since it is impossible to transmit the atmosphere at the meeting place by only the documents, there is also a case where only reading of the documents summarized in shorthand is insufficient as a method of completely knowing the content.

In the sense of adding visual effects, it appears that a copy of supplemental data for an OHP or the like and writing on the blackboard are sufficient. However, since these data are absolutely used for supplementing the content of the lecture, it is meaningless to attach only the data. These supplemental data can become meaningful data in such a case that the relation between the content of the lecture and these data is sufficiently explained.

Since an outline summarized by a lecturer himself or herself includes an assertion of the lecturer as well, and is often explained by use of drawings, it is a most frequently used method.

However, such an outline is usually prepared prior to the lecture. As a result, there is a case where new facts are known or new consideration is made after the preparation of the outline, so that there is a case where a part of the content of the lecture is not set forth in the outline, and sometimes, there is a case where an important portion of issues is not set forth in the outline. Moreover, an episode such as a talk about failure, which is not so worth writing in the outline, can be experienced by only a listener of the lecture.

In the case of combination of the methods (1) and (2)

This is a method in which while a copy of supplemental data for an OHP or the like is seen or a document written on the content of a lecture is seen, a recorded talk of a lecturer is heard. Since the voice of the lecturer can be heard as compared with the case of only documents, what is emphasized by the lecturer is understood. Moreover, since visual effects are also added, this method is superior to only the method (1) or method (2).

However, since the position of a pointer is not recognized while the lecturer speaks, a place to be seen in the supplemental data can not be recognized, and further, since the gesture of the lecturer can not be seen, there is a case that this method is insufficient as a method of completely understanding the content of the lecture.

As described above, according to only the method (1) of document or method (2) of voice, it is impossible to make record to the extent of the content indicated on an OHP film or a projection screen by a lecturer using an indicting stick or a laser pointer.

In the case of method (3) (picture)

As compared with other methods, this method is preferable as a method of recording all the content of the lecture since both the picture and voice can be recorded. Although a recording device and a recording tape are expensive, and the device requires a setting place so that it sometimes becomes an obstacle to the audience, since it is possible to understand the content of the lecture accurately, quickly and easily, this method is extremely excellent as a method of recording the content of the lecture.

SUMMARY OF THE INVENTION

An object of the present invention is, in a lecture using an OHP as a means for providing data, to provide a method other than the foregoing methods (1) to (3) as means for recording the content of the lecture.

Another object of the present invention is, in a lecture using an OHP as a means for providing data, to provide an image pickup device capable of recording a pointer which can not be recorded in the case of the methods (1) and (2).

Still another object of the present invention is, in a lecture using an OHP as a means for providing data, to provide an image pickup device not requiring a setting space which is a problem in the case of a video camera of the method (3).

In order to achieve the above-mentioned objects, the present invention has features in the target of image pickup and the setting place of an image pickup device.

Concretely, the present invention is characterized in that an image pickup device is disposed at a head portion of an OHP, and the target of image pickup is a picture projected on a mirror of the head portion. When this image pickup device is used, in the case where a pointer is used on an OHP film, the image of this pointer is also taken.

A method of taking an image projected on the mirror of the head portion will be described. The original object of the mirror of the head portion of the OHP is to reflect projected light to change the travelling direction of the projected light. When this mirror is made a half mirror, a part of an image projected on the mirror transmits through the mirror. The feature of the present invention is that this transmitted light is made the target of image pickup.

An image pickup device is disposed above the upper portion of the mirror to make pickup of light having transmitted through the half mirror.

The OHP provided with this image pickup device has a feature that both reflected light and transmitted light are used. The reflected light is projected on a screen and provides a picture to the audience at a lecture meeting place similarly to the prior art. The transmitted light is converted into digital signals by the image pickup process, and the digital signals are stored by a computer, or are recorded on a video tape or a disc, so that the picture thereof can be reproduced later. When the digital signals are transmitted to the audience who are not present at the lecture meeting place, the picture can be provided live.

DETAILED DESCRIPTION OF THE PREFERRED EMBODIMENTS

The best mode for carrying out the present invention will first be described in brief.

Figure 1:
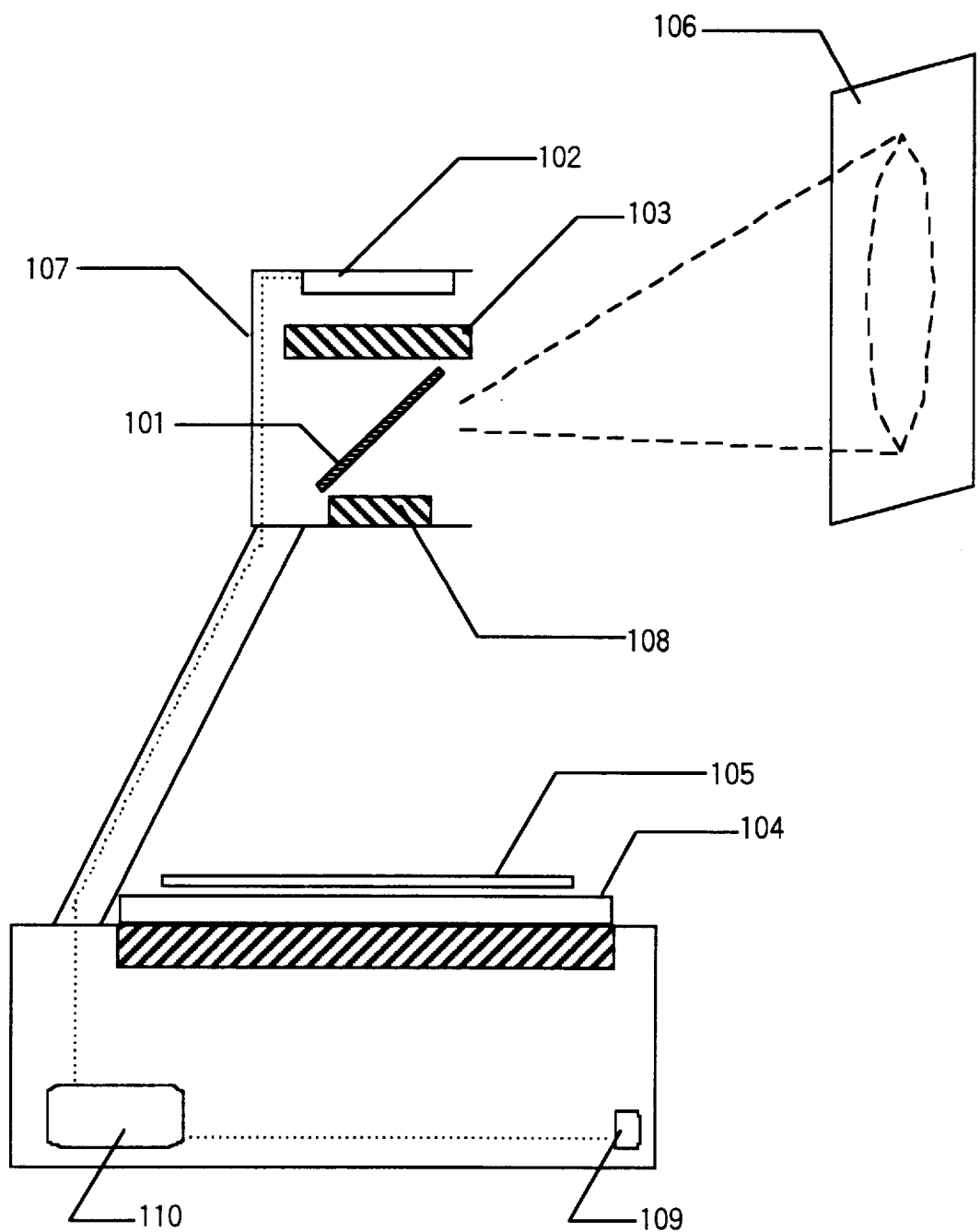
FIG. 1 is a schematic view showing a projection type display device.
Figure 2:
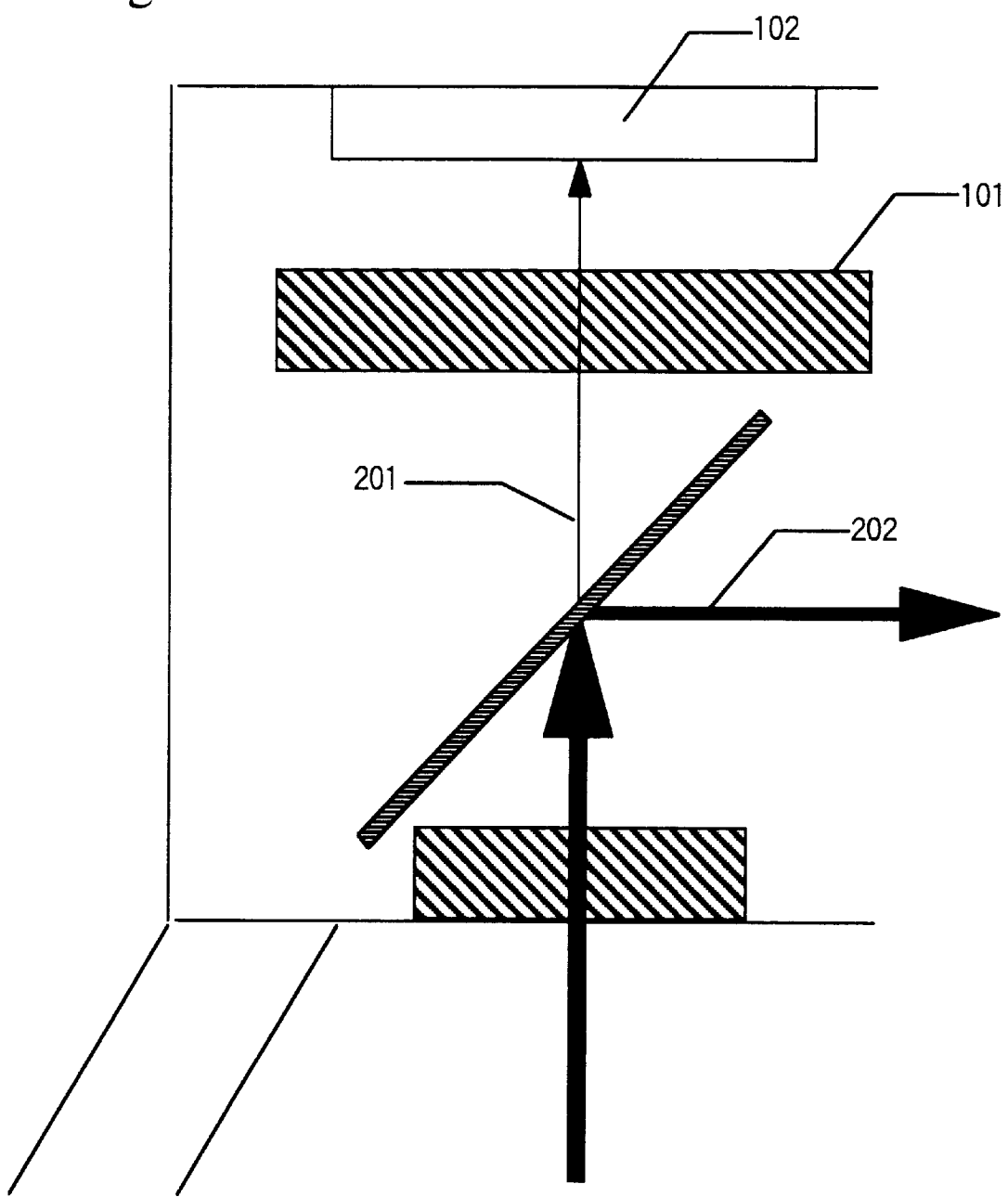
FIG. 2 is a schematic view showing a head portion of the projection type display device.

FIGS. 1 and 2 show a projection type display device which is characterized by comprising the function that an optical path is divided by a half mirror 101, so that one of pictures divided by the half mirror is projected on a projection screen 106 and an image of the other is taken by an image pickup portion 102 at the same time, and is characterized in that an optical system 103 for adjusting focus is disposed between the half mirror and the image pickup portion.

In the present invention, in order to focus on an image sensor as the image pickup portion, it is effective to use the optical system constituted by combination of a plurality of lenses or an aspheric lens and disposed in the space between the half mirror and the image sensor. In the case of an OHP in which the focal point of an image projected on the mirror does not change (in the case where the distance between the optical system under the mirror and the image sensor is constant), if an optical system is set to focus on the image sensor, subsequent adjustment is unnecessary.

On the contrary, in the case of an OHP in which the focal point of an image projected on the mirror is changed (in the case where the distance between the optical system under the mirror and the image sensor is changed), it is effective to set such that the image sensor is always brought into focus by correlatively moving the optical system 103 for the image sensor and an optical system 108 for a screen.

In the present invention, an image projected on a screen is not taken as in a video camera, but projected light itself is taken in, so that according to the position where a pointer is used, there is a case where the pointer is not taken in the image sensor. Concretely, only in the case where the pointer is used on an OHP film 105, the pointer is taken in the image sensor.

Moreover, in the present invention, since transmitted light 201 projected on the image sensor and reflected light 202 projected on the screen have the same light source, if the brightness of one of them is adjusted, the brightness of the other can also be adjusted.

The image sensor is set so that the distance from the optical source is as short as possible and the area thereof is small for making compact. In the case where sizes of screens are different, when the intensity of light is equal for any screens, light is condensed as the area is small, so that smaller one grows light. That is, when the intensity of light is equal for any screens, the brightness is in inverse proportion to the size of the projected area.

In the case where the reflectivity of the optical system is equal to the transmissivity thereof, since the intensity of the reflected light 202 is equal to that of the transmitted light 201, and the area of the image sensor on which transmitted light is projected is smaller than that of the screen on which the reflected light is projected, the picture projected on the image sensor grows light in inverse proportion to the area.

Thus, a half mirror having a reflectivity and transmissivity corresponding to the ratio of the area of the image sensor to that of the screen is used.

Preferred embodiments of the present invention will next be described in detail.

[Embodiment 1]

FIGS. 1 and 2 are schematic views showing an OHP of this embodiment. FIG. 1 is a schematic view showing the entire of the OHP. FIG. 2 is a schematic view showing a head portion 107 of the OHP. Reference numerals in FIG. 2 correspond to those in FIG. 1.

This embodiment relates to an image pickup function integration type OHP, and to the OHP including a picture recording device as well in its inside.

In general, in an OHP, a light path is changed by a mirror at a head portion to project a picture on a projection screen. When this mirror is made a half mirror 101, light 201 transmitting through the half mirror exists. This transmitted light 201 is projected on a CCD image sensor 102 installed at a portion above the half mirror and image pickup is made.

For example, when the size of the CCD image sensor is 10 centimeters square, and the size of the screen is 2 meters square, the area ratio becomes 400 times, so that a material in which the intensity of the reflected light is ideally 400 times, at least 50 times that of the transmitted light, is selected as a material of the half mirror.

If the intensity of light taken in the image sensor is too high, it becomes impossible to distinguish light from shade so that image pickup becomes impossible. However, if the material of the half mirror as described above is selected, the brightness of the image sensor becomes at most about 8 times that of the screen, so that it is possible to make image pickup by the image sensor.

Like this, as a material of the half mirror, taking the difference in the picture size between the image sensor and the screen and the resolution of the image sensor into consideration, a material having a high reflectivity and low transmissivity is selected. In the case of the present invention, it is ideally preferable to use a material having a reflectivity of 99% or more and a transmissivity of from 0.2% to 1.0%.

However, the reflectivity of a common material used as a reflecting material is at most 98% due to an influence of diffusion or absorption. Thus, a material having a reflectivity of 80% or more is selected as a material of the half mirror used in this embodiment.

With respect to the transmissivity, also in view of diffusion, absorption, and the like by a used material, a material having a transmissivity of from 0.2% to 2.0% is selected.

In view of the foregoing reflectivity and transmissivity, silver, aluminum, copper, or gold is used as a material used in the half mirror. Especially, since aluminum has a high absorptance, control of the transmissivity is easy, so that it is useful as a material of the half mirror of the present invention.

In order to bring the CCD image sensor 102 into focus, an optical system 103 for the image sensor is disposed between the half mirror 101 and the image sensor 102. If the function of the lens 103 for the image sensor is changed correspondingly to the function of an optical system 108 for projection, it is possible to bring the image sensor into focus.

It is also useful that the lens 103 for the image sensor is made autofocus with respect to the stage 104. A point for autofocus is provided on the stage 104 of the OHP.

If a picture image taken and transmitted by the CCD image sensor and a voice transmitted from a microphone 109 are recorded by a VTR 110 installed in the inside of the OHP, it is possible to record the content of the lecture, that is, the voice of a lecturer, an OHP film, and a pointer. Although the VTR is used as a recording device installed in the inside of the OHP in this embodiment, other recording device such as an MO may be used.

Since the inside of the OHP becomes hot and the sound of a cooling fan becomes noise, the recording device subjected to a heat insulation and soundproofing process is used.

[Embodiment 2]

This embodiment is characterized in that only an image pickup portion is provided in the inside of an OHP, and recording of picture images is carried out by a device outside the OHP, contrary to the OHP of the embodiment 1 in which the image pickup portion and recording portion are provided therein.

According to this embodiment, since data taken and converted into digital signals can be directly transmitted to a computer, live coverage can be made.

For example, in the case where persons positioned at the back are difficult to see a front screen in a wide meeting place, there is a case where some displays are set for the audience at the back. In such a case, this embodiment is useful.

Moreover, in the case where a meeting place is unexpectedly crowded and some people can not entered the meeting place, if this embodiment is used, it becomes possible to experience the lecture in other meeting place as well.

[Embodiment 3]

This embodiment is an applied embodiment of the embodiment 1 or embodiment 2, and relates to a device in which a liquid crystal panel having a pointer function is installed under a stage on which an OHP film is put, so that a pointer is easily moved and is easily seen.

Figure 3:
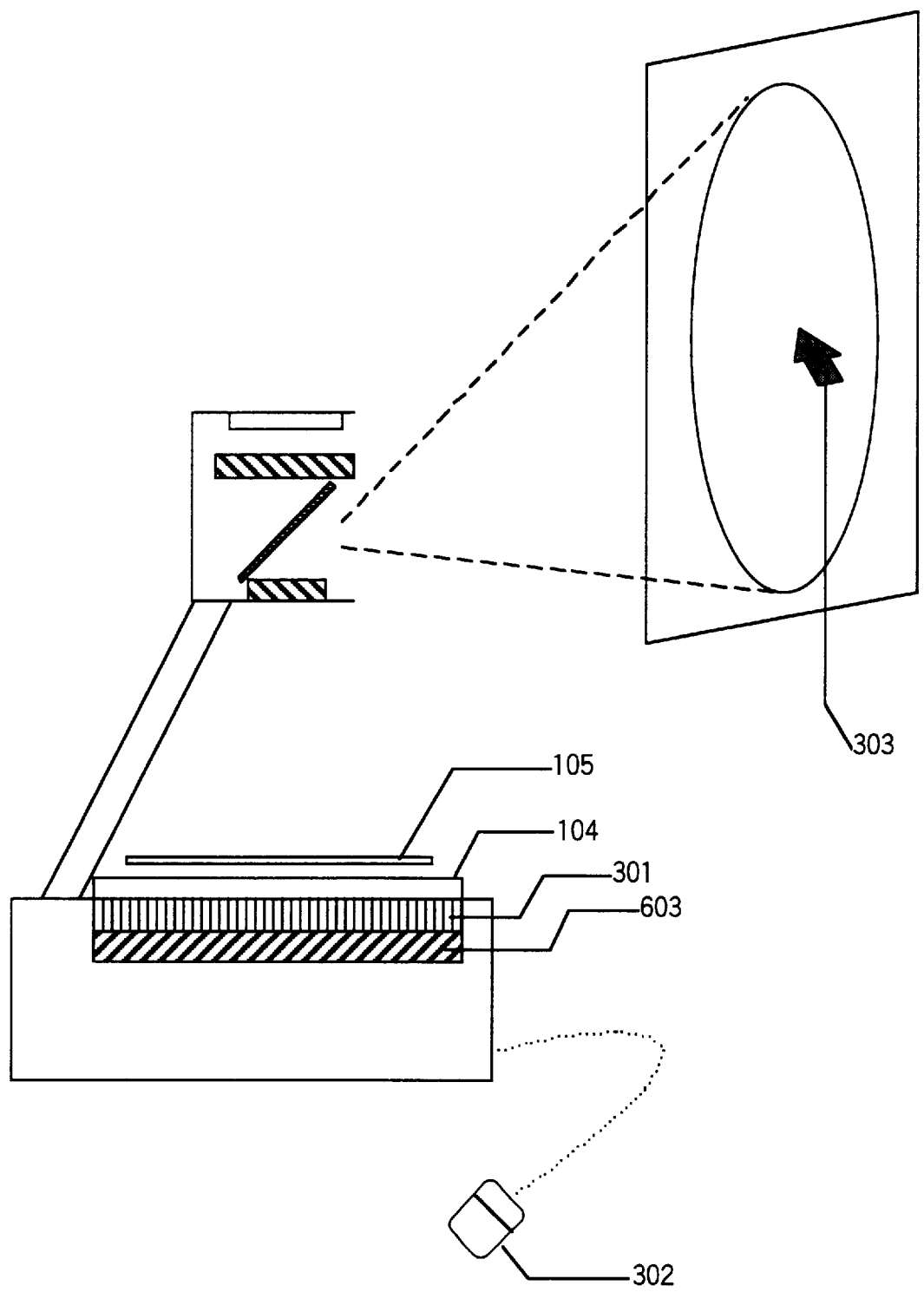
FIG. 3 is a schematic view showing a projection type display device.

FIG. 3 is a schematic view of an OHP of this embodiment.

A liquid crystal panel 301 has a pointer function, and is installed between a stage 104 on which an OHP film 105 is put and a plane lens 603. This liquid crystal panel may be a passive matrix type or an active matrix type, and any material may be used as a liquid crystal material.

A lecturer can use a pointer 303 by moving a mouse 302. When this pointer function is used, it is possible to use the pointer while seeing a screen.

Further, if the mouse is made cordless, it is possible to use this pointer function without paying attention to a cord.

Moreover, it is useful if the color of the pointer can be made changeable, since it is possible to maintain the stressing effect of the pointer even if any color is used at the formation of an OHP film.

In this embodiment, the liquid crystal panel 301 is set under the stage 104 on which the OHP film 105 is put. However, it is also possible that the liquid crystal panel is set over the stage and the OHP film is put between the liquid crystal panel 301 and the stage 104.

[Embodiment 4]

This embodiment is designed to make a picture projected on an image sensor more vivid in the embodiment 1 or embodiment 2.

Figure 4:
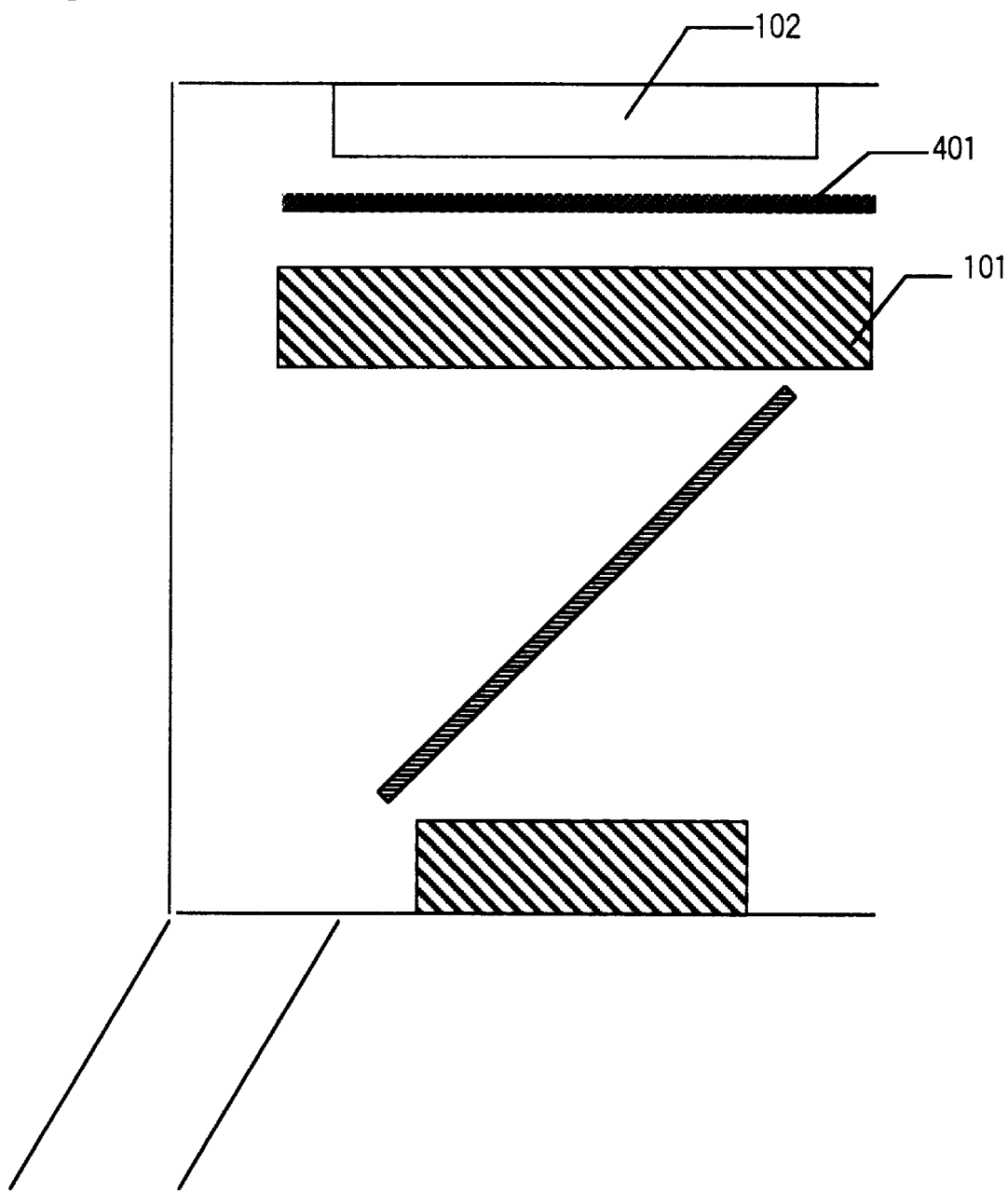
FIG. 4 is a schematic view showing a head portion of the projection type display device.

FIG. 4 is a schematic view of a head portion of an OHP of this embodiment.

An optical system refracts light to cause a lens function. A refractive index of a glass is different according to wavelengths of light. Thus, the focal distance and aberration are different according to wavelengths of light.

From the above, there is a possibility that a colorful image is blurred by the optical system.

Even in the present when a color printer or color copy comes into wide use, data for an OHP are often prepared with black and white or two colors. In this case, it is possible to prevent the blur if surplus colors are cut away by a wavelength selecting filter 401. It is suitable to set the wavelength selecting filter 401 between the optical system 101 and the image sensor 102.

For example, in the case of an OHP film prepared with only red and black, when a red filter as the wavelength selecting filter is inserted, green and blue is cut away so that blur can be prevented.

[Embodiment 5]

Figure 5:
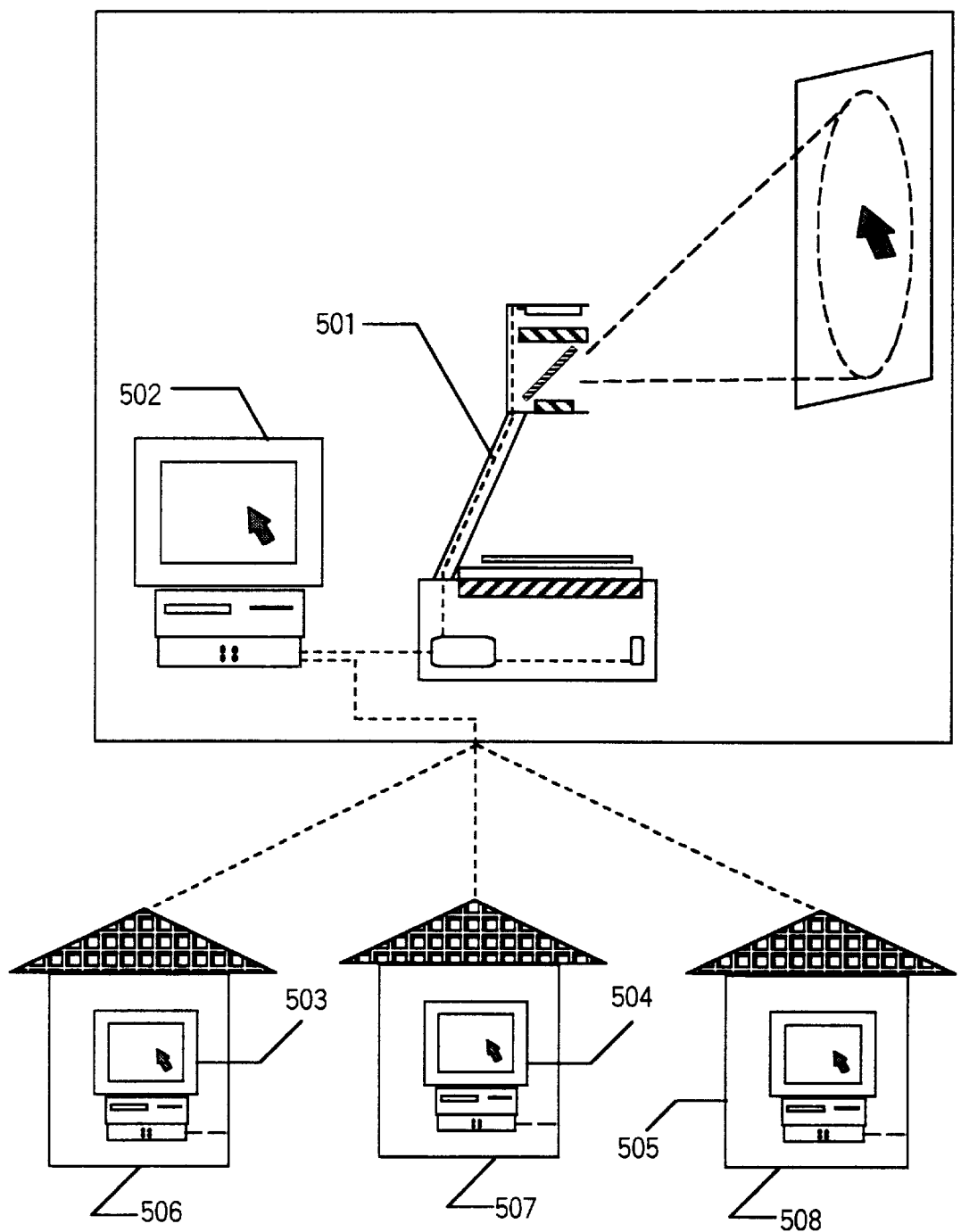
FIG. 5 is a schematic view showing a communication system.
Figure 6:
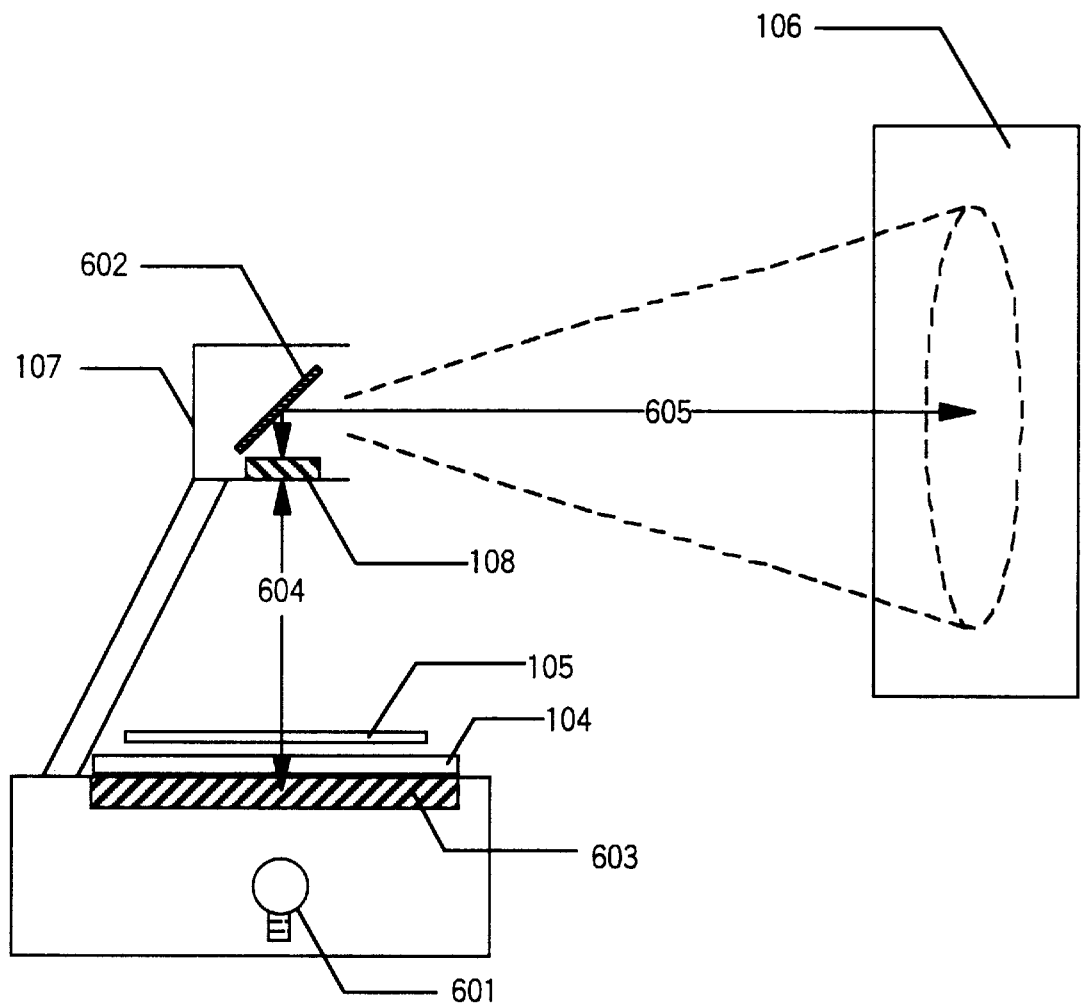
FIG. 6 is a schematic view showing a projection type display device.

This embodiment relates to a communication system using the OHP exemplified in the embodiments 1 to 4. FIG. 5 is a schematic view showing a system of this embodiment. This embodiment is a system in which a picture and voice converted into digital signals by an OHP 501 exemplified by the embodiments 1 to 4 are together transmitted to a computer 502, and further are transmitted to other computers. It becomes extremely useful when this system is used, since if personal computers 503 to 505 are connected to the internet, a lecture can be seen and heard in individual homes 506 to 508 in real time.

According to the present invention, a conventional image pickup device and a projection type display device can be made integrated. Further, the size of the image pickup function integration type projection display device of the present invention can be made almost equal to that of a convention projection display device. As a result, it is possible to provide a system for a lecture in which an image of the content of a lecture can be taken, recorded, and reproduced by a method different from a conventional method.

What is claimed is:

1. A projection type display device comprising:
   a light source for directing a light to an object having an image to be presented by a presenter;
   a half mirror for dividing the light having passed through the object into at least first and second lights;
   an image pickup portion for making image pickup of said first light;
   a sound pick up portion for picking up voice of said presenter;

a screen for receiving the second light to display said image; and a focusing optical system disposed between the half mirror and the image pickup portion, wherein the half mirror has a reflectivity of not less than 80%, and a transmissivity of from 0.2% to 2.0%.

2. A projection type display device according to claim 1, wherein the image pickup portion includes a CCD image sensor.

3. A projection type display device according to claim 1, wherein the optical system includes an autofocus function.

4. A projection type display device according to claim 1, wherein the half mirror comprises a metallic material selected from the group consisting of silver, aluminum, copper and gold.

5. A projection type display device according to claim 1, further comprising means for recording the picked up first light.

6. A projection type display device according to claim 1, further comprising means for recording the picked up voice.

7. A projection type display device according to claim 1, further comprising a wavelength selecting filter disposed between the half mirror and the optical system.

8. A display device according to claim 1, further comprising a liquid crystal panel including a pointer function.

9. A system comprising:
a projection display device comprising:
a half mirror for dividing a light path;
an image sensor for receiving an image transmitted through said half mirror;
a screen for displaying an image reflected by said half mirror; and
a focusing optical system disposed between the half mirror and the image sensor;
a voice picking up device for picking up voice;
a wavelength selecting filter disposed between the half mirror and the focusing optical system;
a first computer for receiving an image data obtained by said image sensor and a voice data obtained by said voice picking up device.

10. A system according to claim 9 wherein said first computer is connected to a second computer so that said image and voice data can be transferred from said first computer to said second computer.

11. A system including a projection display device, said projection display device comprising:
a light source for generating light;
a liquid crystal panel upon which said light is incident;
a half mirror for receiving light passing through said liquid crystal panel;
an image sensor for receiving the light passing through said liquid crystal panel and said half mirror;
a screen for displaying the light passing through the liquid crystal panel and reflected by said half mirror,
wherein the half mirror has a reflectivity of not less than 80% and a transmissivity of not larger than 2.0%.

12. A system according to claim 11 wherein an optical focusing means is provided between said image sensor and said half mirror.

13. A system according to claim 11 wherein said projection display device further includes a recording medium for recording a data obtained by said image sensor.

14. A system according to claim 11 wherein said image sensor is a CCD.

15. A system according to claim 11 further comprising a film having an image to be projected onto the screen wherein said film is juxtaposed to said liquid crystal panel.

16. A projection type display device comprising:
a light source for directing a light to an object having an image to be presented by a presenter;
a pointer for putting a point on said object by the presenter during presentation in order to indicate a specific portion of the image;
a half mirror for dividing the light passing through the object into at least first and second lights;
an image pickup device for picking up said first light wherein said first light has said specific portion of the image indicated by said point;
a screen for receiving the second light to display said image,
wherein the half mirror has a reflectivity of not less than 80% and a transmissivity of not larger than 2.0%.

17. A device according to claim 16 wherein said image pickup device is a CCD image sensor.

18. A device according to claim 16 further comprising a focusing optical system disposed between the half mirror and the image pickup device.

19. A device according to claim 16 wherein said pointer comprises a liquid crystal panel.

20. A method of making a presentation using a projection type display device, said method comprising:
producing an image light to be displayed on a screen;
dividing said image light to at least a first image light and a second image light by a half mirror;
projecting said first image light onto a screen in order to make a presentation by a presenter; and
picking up said second image light by an image sensor,
wherein a voice of said presenter is simultaneously picked up,
wherein the half mirror has a reflectivity of not less than 80%, and a transmissivity of from 0.2% to 2.0%.

21. The method according to claim 20 further comprising a step of storing the picked up second image light and the picked up voice.

22. The method according to claim 20 further comprising a step of transferring the picked up second image light and the picked up voice to a computer through an internet.

23. A method of making a presentation using a projection type display device, said method comprising:
preparing an object having an image to be presented by a presenter;
putting a point onto said object during the presentation in order to indicate a specific portion of the image;
passing a light from a light source through said object to produce an image light having said specific portion indicated by said point;
dividing said image light into a least first and second image lights by a half mirror;
projecting said first image light onto a screen in order to make a presentation;
picking up said second image light by an image sensor,
wherein a wavelength selecting filter is disposed between the half mirror and the image sensor.

24. A method according to claim 23 wherein a voice of said presenter is simultaneously picked up.

25. The method according to claim 24 further comprising a step of storing the picked up second image light and the picked up voice.

26. The method according to claim 24 further comprising a step of transferring the picked up second image light and the picked up voice to a computer through an internet.

27. A method according to claim 23 wherein said object is a film.

28. A method of making a presentation using a projection type display device, said method comprising:

preparing a film having an image to be presented by a presenter;

putting a point on said film during the presentation in order to indicate a specific portion of the image;

passing a light from a light source through said film to produce an image light having said specific portion indicated by said point;

dividing said image light into at least first and second image lights by a half-mirror;

projecting said first image light onto a screen in order to make a presentation;

picking up said second image light by an image sensor, wherein the half mirror has a reflectivity of not less than 80% and a transmissivity of not larger than 2.0%.

29. A method according to claim 28 wherein a voice of said presenter is simultaneously picked up.

30. The method according to claim 29 further comprising a step of storing the picked up second image light and the picked up voice.

31. The method according to claim 29 further comprising a step of transferring the picked up second image light and the picked up voice to a computer through an internet.

32. A method of making a presentation using a projection type display device, said method comprising:

preparing an object having an image to be presented by a presenter;

passing a light from a light source through said object to produce an image light;

dividing said image light into at least first and second image lights by a half mirror;

projecting said first image light onto a screen in order to make a presentation;

picking up said second image light by an image sensor;

picking up voice of the presenter simultaneously as said second image;

transferring the picked up second image light and the picked up voice to a computer through an internet, wherein the half mirror has a reflectivity of not less than 80% and a transmissivity of not larger than 2.0%.

33. A method of making a presentation using a projection type display device, said method comprising:

preparing an object having an image to be presented by a presenter;

putting a point onto said object during the presentation in order to indicate a specific portion of the image;

passing a light from a light source through said object to produced an image light having said specific portion indicated by said point;

dividing said image light into at least first and second image lights by a half mirror;

projecting said first image light onto a screen in order to make a presentation;

picking up said second image light by an image sensor; and transferring the picked up second image light to a computer through an internet, wherein the half mirror has a reflectivity of not less than 80% and a transmissivity of not larger than 2.0%.

* * * * *